(12) United States Patent
Spencer et al.

(10) Patent No.: US 7,007,120 B2
(45) Date of Patent: Feb. 28, 2006

(54) INFORMATION TRANSFER PROTOCOL HAVING SYNC FIELDS OF DIFFERENT LENGTHS

(75) Inventors: Andrew M. Spencer, Eagle, ID (US); Robert G. Mejia, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 361 days.

(21) Appl. No.: 10/423,103

(22) Filed: Apr. 25, 2003

(65) Prior Publication Data
US 2004/0267993 A1 Dec. 30, 2004

(51) Int. Cl.
G06F 13/00 (2006.01)
G06F 13/42 (2006.01)

(52) U.S. Cl. ...................... 710/110; 710/105
(58) Field of Classification Search ............... 710/110, 710/105
See application file for complete search history.

(56) References Cited

U.S. PATENT DOCUMENTS

| | | | |
|---|---|---|---|
| 4,928,075 A * | 5/1990 | Leis ............................. 331/17 |
| 5,323,385 A | 6/1994 | Jurewicz et al. |
| 5,542,116 A * | 7/1996 | Schellinger .............. 455/343.3 |
| 5,710,755 A | 1/1998 | Chen |
| 5,719,858 A * | 2/1998 | Moore ......................... 370/347 |
| 6,898,766 B1 * | 5/2005 | Mowery et al. ............... 716/1 |
| 2004/0013123 A1 * | 1/2004 | Paulson et al. ............. 370/412 |

FOREIGN PATENT DOCUMENTS

EP 0984592 3/2000

OTHER PUBLICATIONS

Universal Serial Bus System Architecture—Chapter 7, pp. 83-108—Don Anderson—MindShare, Inc.—1997.*
"Transferring Data In Selectable Transfer Modes," U.S. Appl. No. 10/295,651, filed Nov. 15, 2002.
"The MultiMedia Card," System Summary Version 3.2(c), Jan. 2002, MMCA Technical Committee (31 p.).
Larson, et al; 'Adding Another Layer to the ISO Net Archiecture Reduces Costs;' Data Communications, McGraw Hill; New York, US; vol. 12, No. 3, Mar. 1983; pp. 215-218, 221-222, XP000814514.
Data Communication—High-Level Data Link Control Procedures—Frame Structure; International Organization for Statdardization; XP-000814423; Jul. 1979, pp. 1-5.

* cited by examiner

Primary Examiner—Rehana Perveen
Assistant Examiner—Jeremy S. Cerullo

(57) ABSTRACT

Systems and methods of information transfer are disclosed. In one embodiment, the system may comprise a master device and a slave device coupled by a bus in which clock information is embedded in the data stream. Various flow control techniques may be used to compensate for differences in transfer rates supported by the master and slave devices. Two types of synchronization fields may be employed to establish and maintain clock acquisition. The master device may transfer information to the slave device using a sync field of a first type followed by a first data packet, and the slave device may respond to each data packet with a sync field of a second, different type, followed by a status ready field if no additional time is needed before receiving another data packet.

26 Claims, 10 Drawing Sheets

Fig. 3a
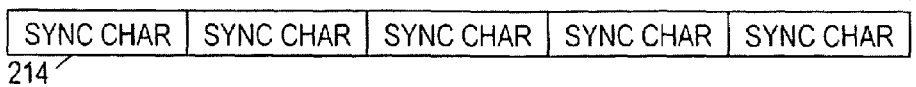
Fig. 3b
Fig. 3c    Fig. 3d
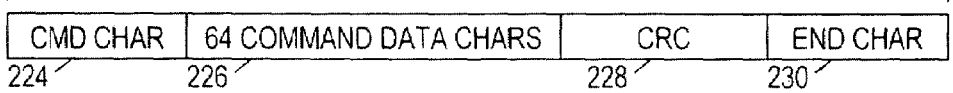
Fig. 3e
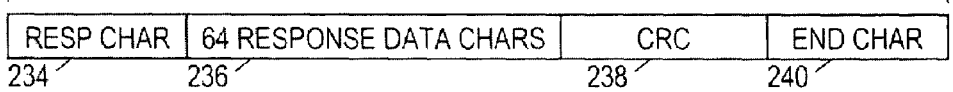
Fig. 3f

INFORMATION TRANSFER PROTOCOL HAVING SYNC FIELDS OF DIFFERENT LENGTHS

CROSS-REFERENCE TO RELATED APPLICATIONS

This application is related to copending U.S. patent application Ser. No. 10/295,651, filed on Nov. 15, 2002, and entitled "Transferring Data in Selectable Transfer Modes", which is incorporated by reference in its entirety herein.

BACKGROUND

Many digital devices have become consumer goods. Digital phones, digital cameras, digital music players, personal digital assistants (PDAs) and personal computers are just some examples of popular digital technology. With the growth of such technology comes a desire to transfer digital information between devices. In the context of portable digital devices, such information transfer becomes particularly desirable.

Portable digital devices often omit many amenities to maximize portability. For example, portable digital devices may lack a full-scale user interface, an ability to store data on archival media, and features having a significant power demand (e.g., advanced digital processing features). Consequently, a desirable feature of any portable digital device is the ability to transfer digital information between the portable digital device and a host digital device having the desired features.

Information transfer may be done directly, or alternatively may be done using information storage media. One information storage medium of particular interest is a solid-state memory device. Such a memory device may be packaged into a removable memory card. The portable digital device may store information on the memory device. The memory device may then be coupled to a host digital device, perhaps after being removed from the portable digital device. The host digital device may then retrieve stored information from the memory device. Of course information transfer may be bidirectional, so the host digital device may store data in the memory device and the portable digital device may retrieve data from the memory device.

Currently, memory cards have a data storage capacity in a range from about 2 megabytes (MB) to about 1 gigabyte (GB) with larger capacities expected in the near future. Although many memory cards provide large volumes of memory, the data transfer rate for retrieving files from memory are often rather slow, i.e., on the order of 10 to 20 MB/sec. At this rate, a host digital device would take nearly 1–2 minute to retrieve 1 GB from a memory card. Thus it would be desirable to have an information transfer protocol offering significantly higher transfer speeds without substantially increased complexity on a memory device.

BRIEF SUMMARY

Accordingly, there is disclosed herein systems and methods of information transfer. In one embodiment, the system may comprise a master device and a slave device coupled to the master device by at least one bus. The bus may be a high-speed differential serial bus in which clock information is embedded in the data stream. Various flow control techniques may be used to compensate for differences in transfer rates supported by the master and slave devices. Two types of synchronization fields may be employed to establish and maintain clock acquisition.

In one embodiment, the system comprises a master device and a slave device coupled to the master device by at least one bus. The master device transfers information to the slave device using a sync field of a first type followed by a first data packet, and the slave device responds to each data packet with a sync field of a second, different type, followed by a status ready field if no additional time is needed before receiving another data packet. The master device may be coupled to the slave device by either a serial or a parallel bus configured to transport commands.

BRIEF DESCRIPTION OF THE DRAWINGS

For a detailed description of various embodiments of the invention, reference will now be made to the accompanying drawings in which:

FIGS. 3a–3f show packets and fields that may be employed in accordance with various information transfer protocol embodiments;

NOTATION AND NOMENCLATURE

Certain terms are used throughout to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The drawings and following discussion are directed to various system and method embodiments. Although one or more of these embodiments may be preferred, the embodiments disclosed should not be interpreted, or otherwise used, as limiting the scope of the disclosure, including the claims.

In addition, one skilled in the art will understand that the following description has broad application, and the discussion of any embodiment is meant only to be exemplary of that embodiment, and not intended to suggest that the scope of the disclosure, including the claims, is limited to that embodiment.

Figure 1:
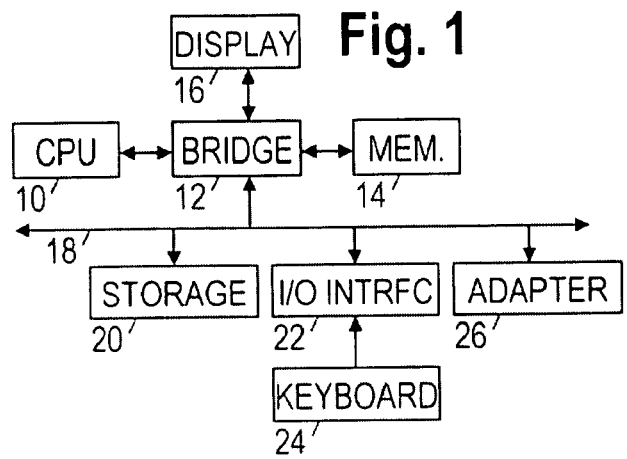
FIG. 1 shows an example of a digital system in which various information transfer protocol embodiments may be employed.

Memory devices may be coupled to digital devices for information storage and retrieval. FIG. 1 shows a computer system, an example of where a memory device may be employed.

The computer system of FIG. 1 includes a central processing unit (CPU) 10 coupled by a bridge 12 to a system memory 14 and a display 16. CPU 10 is further coupled by bridge 12 to an expansion bus 18. Also coupled to the expansion bus 18 are a storage device 20 and an input/output interface 22. A keyboard 24 may be coupled to the computer via input/output interface 22.

CPU 10 may operate in accordance with software stored in memory 14 and/or storage device 20. Under the direction of the software, the CPU 10 may accept commands from an operator via keyboard 24 or some alternative input device, and may display desired information to the operator via display 16 or some alternative output device. CPU 10 may control the operations of other system components to retrieve, transfer, and store data.

Bridge 12 coordinates the flow of data between components. Bridge 12 may provide dedicated, high-bandwidth, point-to-point buses for CPU 10, memory 14, and display 16.

Memory 14 may store software and data for rapid access. Memory 14 may include integrated memory modules, one or more of which may be volatile.

Display 16 may provide data for use by an operator. Display 16 may further provide graphics and may include advanced graphics processing capabilities.

Expansion bus 18 may support communications between bridge 12 and multiple other computer components. Bus 18 may couple to removable modular components and/or components integrated onto a circuit board with bridge 12 (e.g., audio cards, network interfaces, data acquisition modules, modems, etc.)

Storage device 20 may store software and data for long-term preservation. Storage device 20 may be portable, or may accept removable media, or may be an installed component, or may be a integrated component on the circuit board. Storage device 20 may be a removable memory device such as a memory card. Alternatively, storage device 20 may be a nonvolatile integrated memory, a magnetic media storage device, an optical media storage device, or some other form of long-term information storage.

Input/output interface 22 may support communications with legacy components and devices not requiring a high-bandwidth connection. Input/output interface 22 may further include a real-time clock and may support communications with scan chains for low-level testing of the system.

Keyboard 24 may provide data to interface 22 in response to operator actuation. Other input devices (e.g., pointing devices, buttons, sensors, etc.) may also be coupled to input/output interface 22 to provide data in response to operator actuation. Output devices (e.g., parallel ports, serial ports, printers, speakers, lights, etc.) may also be coupled to input/output interface 22 to communicate information to the operator.

An adapter 26 may be coupled to expansion bus 18 to couple the expansion bus to removable memory devices such as memory cards. Alternatively, adapter 26 may be fashioned to couple to a portable digital device for information transfer between the computer system and the portable digital device.

In addition to the above-described computer system, many other general purpose and customized digital devices and systems may beneficially be configured for information transfer between them and memory devices such as memory cards.

Figure 2A:
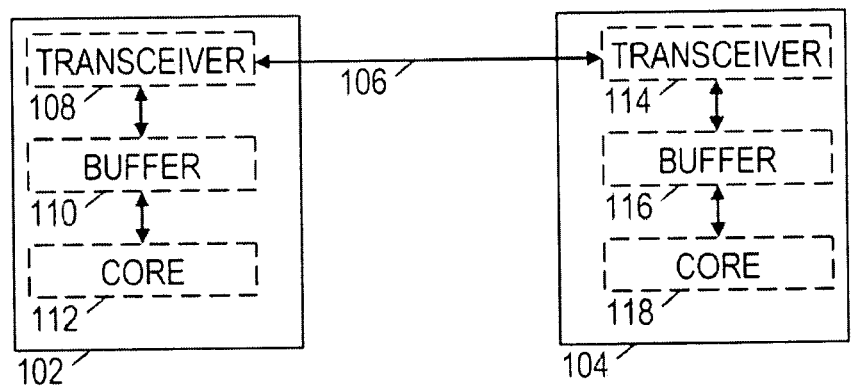
FIGS. 2a–2b show alternative bus configurations between a digital device to a memory device.

FIG. 2a shows a digital device 102 coupled to a memory device 104 via a bus 106. In one embodiment, bus 106 is a high-speed, half-duplex serial connection that employs differential signaling. Alternatively, bus 106 may employ non-differential signaling, may operate in full-duplex mode, and/or may be a parallel connection. The data sent via bus 106 may be encoded to embed clock information in the data stream.

Digital device 102 may include a transceiver 108 that converts signals from bus 106 into digital receive data. Transceiver 108 may further convert digital transmit data into signals for transmission on bus 106. A buffer 110 may be included in digital device 102 to aid in avoidance of underflow/overflow conditions and/or to provide for transition between clock domains.

Digital device 102 may further include a functional "core" 112 that is coupled to buffer 110 to provide transmit data and accept receive data. Core 112 may additionally coordinate the operation of bus 106, or such functionality may be included in transceiver 108. Alternatively, transceiver 108 and 112 may cooperate in coordinating the operation of bus 106.

Memory device 104 may include a transceiver 114, buffer 116, and functional core 118. As with transceiver 108, transceiver 114 may convert signals from bus 106 into digital receive data that is provided to buffer 116. Transceiver 114 may further convert digital transmit data from buffer 116 into signals for transmission on bus 106. Buffer 116 may operate to avoid underflow/overflow conditions and/or to assist in transferring data between clock domains. Functional core 118 may accept receive data from buffer 116 and provide transmit data to buffer 116. Functional core 118 and/or transceiver 114 may cooperate with digital device 102 in the coordination of bus operations. In a contemplated embodiment, the functional core 118 includes an information storage medium to which the data may flow and from which the data may be retrieved.

It is noted that digital device 102 and memory device 104 may support different data transfer rates. For example, digital device 102 may support transmit data rates of 200 MB/s, while memory device 104 may only be able to store an average of 150 MB/s, perhaps due to limitations in functional core 118. The reverse might also be true, and it may also be true that the supported transmit and receive rates for a given device are different. Accordingly, a data flow control technique may be employed to avoid underflow or overflow errors in the buffers 110,116.

Figure 2B:
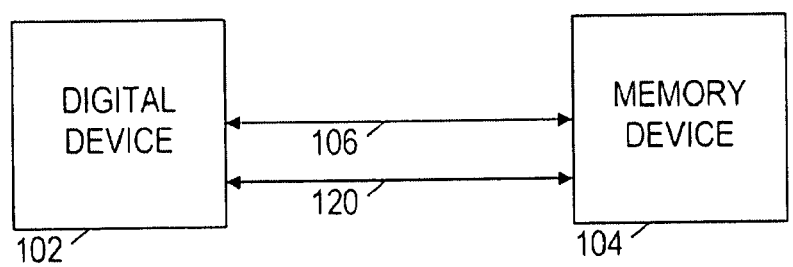

Related U.S. patent application Ser. No. 10/295,651, describes in greater detail various hardware embodiments that may suitably employ information transfer protocols described herein. As described in the related application and as shown in FIG. 2b, devices 102 and 104 may be coupled by a second bus 120 in addition to bus 106. Bus 120 may be physically separate from bus 106. Alternatively, bus 120 and bus 106 may share physical conductors but operate in some time- or frequency-multiplexed fashion or in some other fashion that offers virtually separate operation. In one contemplated embodiment, bus 120 is a Secure Digital bus or a MultiMedia Card System bus, and bus 106 is a differential high-speed serial bus that shares physical conductors with bus 120. Configuration and initiation commands may be communicated via bus 120, whereas data and flow control information may be communicated via bus 106.

As will be discussed further below, bus 106 may include a dedicated control line. The use of the term "dedicated" should not be taken to mean that the control line cannot be used for other purposes if the line is physical shared with a second bus. Rather, this term means merely that bus 106 may use this line for transporting control information and that bus 106 does not use this line for transporting data.

FIGS. 3a–3f show examples of protocol units which may be transported by bus 106. FIG. 3a is an example of a data packet 202, which may include a start character 204, a block 206 of user data characters, a cyclic redundancy code (CRC) checksum 208, and an end character 210. Block 206 may include a fixed number of data characters such as, e.g., 512. Each data character in block 206 may be a 10-bit representation of an 8-bit data value, such as may be determined using a DC-balanced, run-length limited 8b/10b code such as that disclosed in U.S. Pat. No. 4,486,739 to Franaszek and Widmer. The run-length limitations provided by such a code ensure that the data stream provides enough transitions to provide for clock recovery at the receiving end.

Start character 204 may be a unique 10 bit value of a run-length limited 8b/10b code that does not correspond to a valid representation of an 8 bit data value. Similarly, end character 210 may be a (different) unique 10 bit value of a run-length limited 8 b/10 b code that does not correspond to a valid representation of an 8 bit data value. Checksum 208 may be two 10-bit characters determined by applying the above-mentioned 8b/10b code to a sixteen-bit CRC checksum. Various other checksum sizes may alternatively be used. Alternatively, a block of redundancy information may be provided using an error correction code (ECC). For example, the checksum 208 may be replaced with a sixteen 10-bit characters determined by applying the above-mentioned 8b/10b code to a 16 byte redundancy block. The redundancy block may be determined from the data block using, e.g., a Reed-Solomon error correction code.

On the receive side, the checksum 208 may be used to verify the absence of data transmission errors. If the redundancy block is used, a decoding process may be used to detect and/or correct data transmission errors. The use of a CRC checksum or an ECC redundancy block, and the sizes thereof, are decisions based on a tradeoff between expected error rate and desired data throughput.

FIG. 3b is an example of a long synchronization (long "sync".) field 212, which may include a fixed number (e.g., five) of sync characters 214. The sync characters 214 may be 10 bit values with a maximum number of transitions to aid in clock synchronization. The sync character 214 is also a unique 10 bit value of a run-length limited 8b/10b code that may or may not correspond to a valid representation of an 8 bit data value. For example, each sync character 214 may be "1010101010". FIG. 3c is an example of a short sync field 216, which similarly may include a fixed number of sync characters 214. The number of sync characters in the short sync field may be two, and in any event, is less than the number of sync characters in a long sync field 212.

FIG. 3d is an example of a status field 218, which may include a start character 219 and a status character 220. As before, the characters may be 10 bit values. Start character 219 may be the same as start character 204, or alternatively start character 219 may be another unique 10 bit value to signal the beginning of a status field. The status character 220 may be one of a number of unique 10 bit values that are not valid representations of 8 bit values. Each different status character may represent a different memory device status. Examples of memory device statuses may include: 1) Ready to send next data packet; 2) Not ready to send next data packet; 3) Last data packet sent of transfer; 4) Ready to receive next data packet; 5) Calculating CRC and not ready to receive next data packet; 6) CRC good but not ready to receive next data packet; 7) Error detected and ready to transition to error handling; and 8) Error detected and not ready to transition to error handling.

FIG. 3e is an example of a command packet 222, which may include a start command character 224, a block 226 of command data characters, a CRC checksum 228, and an end character 230. Start command character 224 may be a unique 10 bit value to indicate the beginning of a command packet, and may be different from start character 204. Start command character 224 may not be a valid representation of an 8 bit value under the 8b/10b coding scheme. The block 226 of command characters preferably includes a fixed number of 10-bit characters, e.g., 64. The 10-bit characters may be determined by applying the previously mentioned 8 b/10 b encoding scheme to a 64-byte block of command data. Checksum 228 may include two 10-bit characters determined by 8b/10b encoding of two CRC checksum bytes. As before, alternative checksum sizes may be employed, and in another alternative, the checksum may be replaced by an ECC redundancy block determined by applying a Reed-Solomon error correction code to the block of command data. End character 230 may be the same as end character 210.

FIG. 3f is an example of a response packet 234, which may include a start response character 234, a block 236 of response data characters, a checksum (or ECC redundancy block) 238, and an end character 240. The start response character 234 may be the same as the start command character 224 or alternatively may be a different unique 10-bit character. Block 236 may include a fixed number of 10-bit characters, e.g., 64. As before, the 10 bit characters may be determined by applying an 8b/10b code to a correspondingly-sized block of data bytes. Checksum 238 may be a two character checksum as determined previously, and end character 240 may be the same as end characters 210 and 230.

In a contemplated embodiment, the fields and packets described above are transmitted using a bit-cell time less than about 1 to 2 nanoseconds. Note that not all of these packets and fields are used in all of the embodiments described below.

The ensuing flow diagrams may show the architecture, functionality, and operation of possible implementations of the data reading and data writing methods and mechanisms. In this regard, each block may represent a module, segment, or portion of software (or firmware) code, which comprises one or more executable instructions for implementing the specified logical function(s). More likely, however, these flow diagrams may be implemented in hardware to support the desired data rates. The hardware implementation may take the form of a hardware state machine. It should also be noted that in some alternative implementations, the functions noted in the blocks may occur out of the order noted. For example, the two blocks 302 and 304 shown in succession in FIG. 4a may in fact be executed substantially concurrently or the blocks may sometimes be executed in the reverse order, depending upon the functionality involved, as will be further clarified herein below.

Figure 4A:
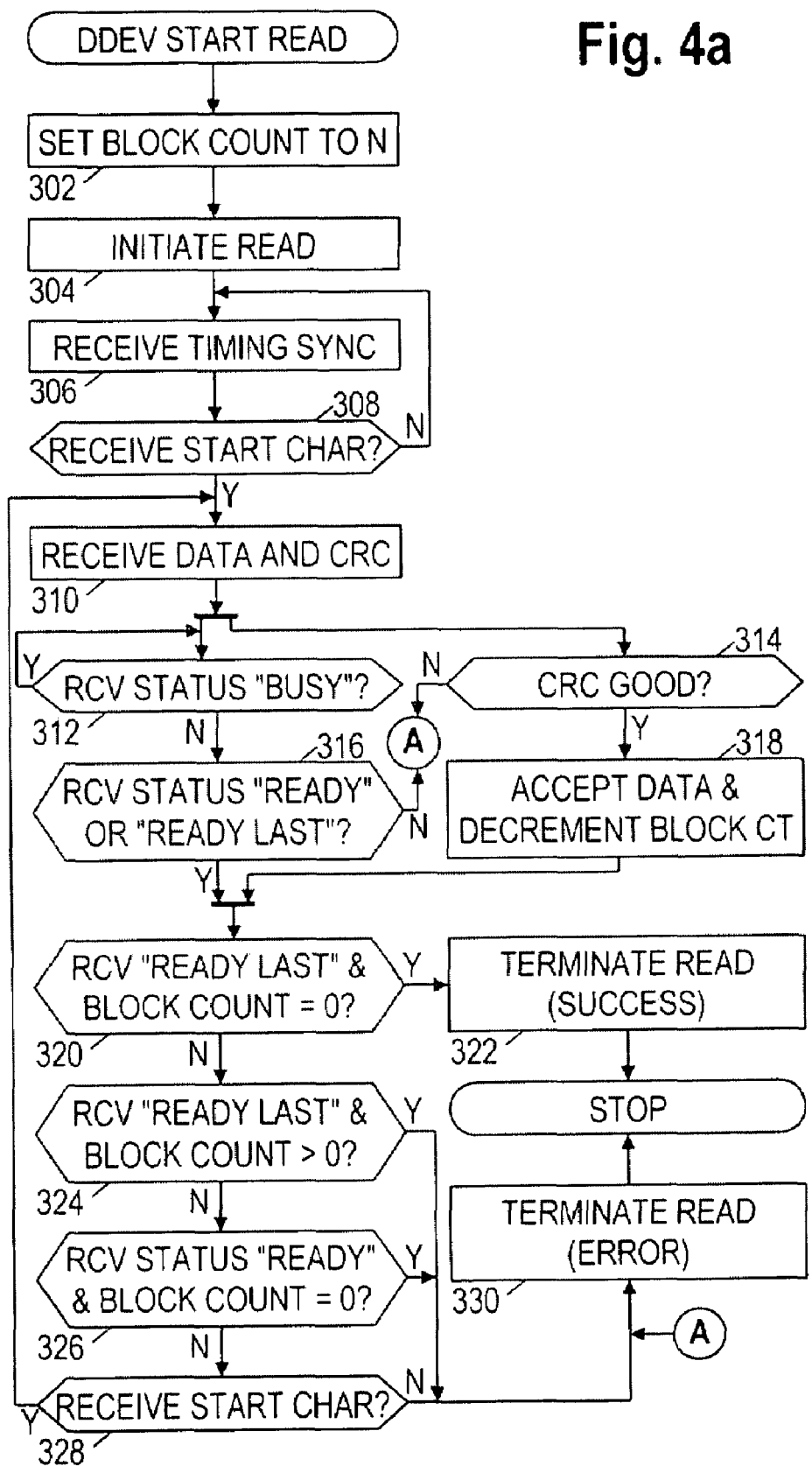
FIGS. 4a–4b show example flow diagrams that may be used to implement a read sequence in accordance with certain information transfer protocol embodiments.

FIG. 4a shows an example of a flow diagram that a digital device may use to implement one or more embodiments of the disclosed information transfer protocol. The digital device may use this flow diagram to retrieve data from the memory device. Beginning in block 302, the digital device 102 may determine a number of data blocks to be received via bus 106, and may initialize a block counter to track the number of blocks remaining. In block 304 digital device 102 may initiate the data retrieval process. In one embodiment, this initiation may include sending a command packet to the memory device 104 via bus 106 (e.g., as described below with reference to FIG. 9a). Alternatively, a read instruction may be communicated to memory device 104 via some other means such as a second bus 120.

After the memory device 104 receives a read command, it may reply with a long synchronization field that digital device 102 detects in block 306. Digital device 102 may use the long synchronization field sync character to synchronize a local clock with the transmit clock being used by memory device 104. Such synchronization may be accomplished using a phase-lock loop (PLL). As synchronization is achieved, digital device 102 begins monitoring bus 106 in block 308 for a data block start character. Following reception of the start character, the digital device receives the data block and the corresponding checksum in block 310.

After block 310, the flow diagram forks to indicate concurrent execution. In block 312, the digital device 102 monitors the bus for status "busy" fields. Concurrently in block 314, the digital device 102 verifies the checksum value to determine if a transmission error occurred. If an error is detected, the digital device 102 terminates the read operation in block 330. Otherwise, in block 318, the digital device 102 accepts the data block and decrements the block count. Meanwhile, in block 316, digital device 102 determines if the sequence of busy fields is followed by a status "ready" field or a status "last" field. If not, control passes to block 330. Otherwise, a join operation follows blocks 316 and 318. The traversal of all the concurrency paths connected to a join operation must complete before any operations subsequent to the join operation are performed.

Thus, once the data block has been accepted and an appropriate status field has been received, then in block 320 digital device 102 determines whether the status field was a status "last" field and the block count is zero. If so, then in block 322, digital device 102 terminates the read operation successfully (i.e., all the data blocks have been received without error). Otherwise, in block 324, digital device 102 determines whether a status "last" field was received before the block count reached zero. If so, control passes to block 330. Otherwise, in block 325, digital device 102 determines whether the block count reached zero without a status "last" field being received. If so, control passes to block 330. Otherwise, in block 328, digital device 102 determines if the status field is followed by a data block start character. If not, control passes to block 330. Otherwise, control returns to block 310.

Figure 4B:
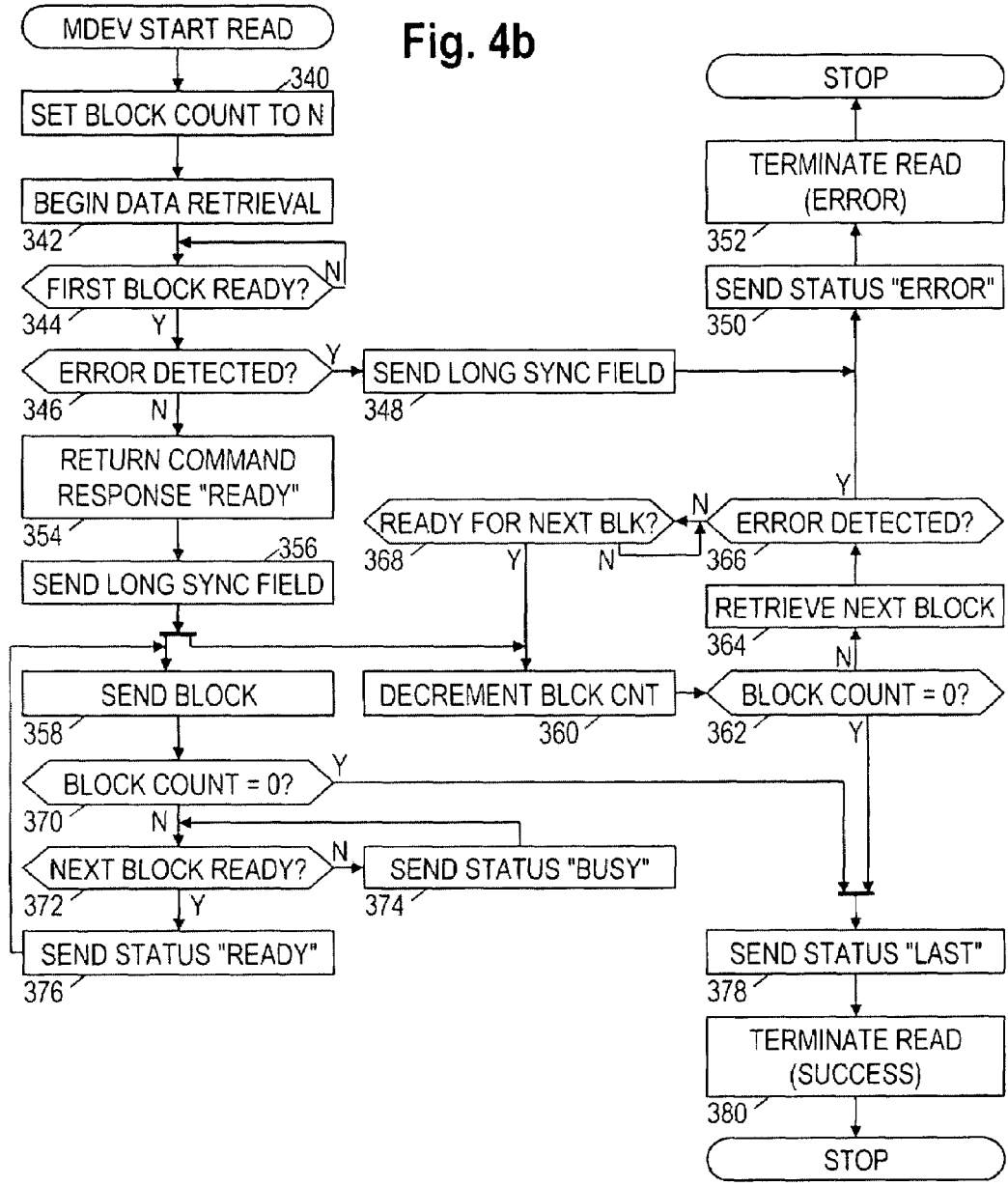

FIG. 4b shows an example of a flow diagram that a memory device may use to implement one or more embodiments of the disclosed information transfer protocol. Memory device 104 may use this flow diagram to send data to the digital device.

When memory device 104 receives a read instruction from digital device 102, it sets a block counter to indicate the number of data blocks remaining to be sent in block 340. In block 342, memory device 104 begins a transfer of data from the storage media (e.g., a memory array) to a buffer. Memory device 104 waits in block 344 until the first data block is ready to be sent. In block 346, memory device 104 determines whether a retrieval error occurred. If so, in block 348 memory device 104 sends a long sync field, and in block 350 it sends a status "error" field. In block 352, memory device 104 terminates the read operation as an unsuccessful operation.

Returning to block 346, if no error is detected, then in block 354 memory device 104 responds to the initiation of the read operation. In one embodiment, this response may be issued over a second bus 120. In block 356, memory device 104 sends a long sync field. A fork follows block 356, indicating concurrent execution of blocks 358 and 360. In block 358, memory device 104 sends the data block (and a checksum) to digital device 102. In block 360, memory device 104 decrements the block count.

In block 362, memory device 104 determines whether the block count is zero. If so, the flow path reaches a join operation. Otherwise, in block 364, memory device 104 begins retrieving the next data block. In block 366, memory device 104 determines whether an error occurred during retrieval. If so, control passes to block 350. Otherwise, in block 368 memory device 104 waits until a status "ready" field has been sent before moving back to block 360.

After a data block is sent in block 358, the memory device 104 checks in block 370 to determine whether the block count is zero. If not, then in block 372, memory device 104 determines whether the next data block is ready to be sent. The memory device 104 repeatedly sends status "busy" fields in block 374 until the next data block is ready. In block 376, memory device 104 sends a status "ready" field and control returns to block 358.

If the block count is zero in block 370, then control passes to the join operation. After the join, memory device 104 sends a status "last" field in block 378, and terminates the read operation successfully in block 380.

Figure 5A:
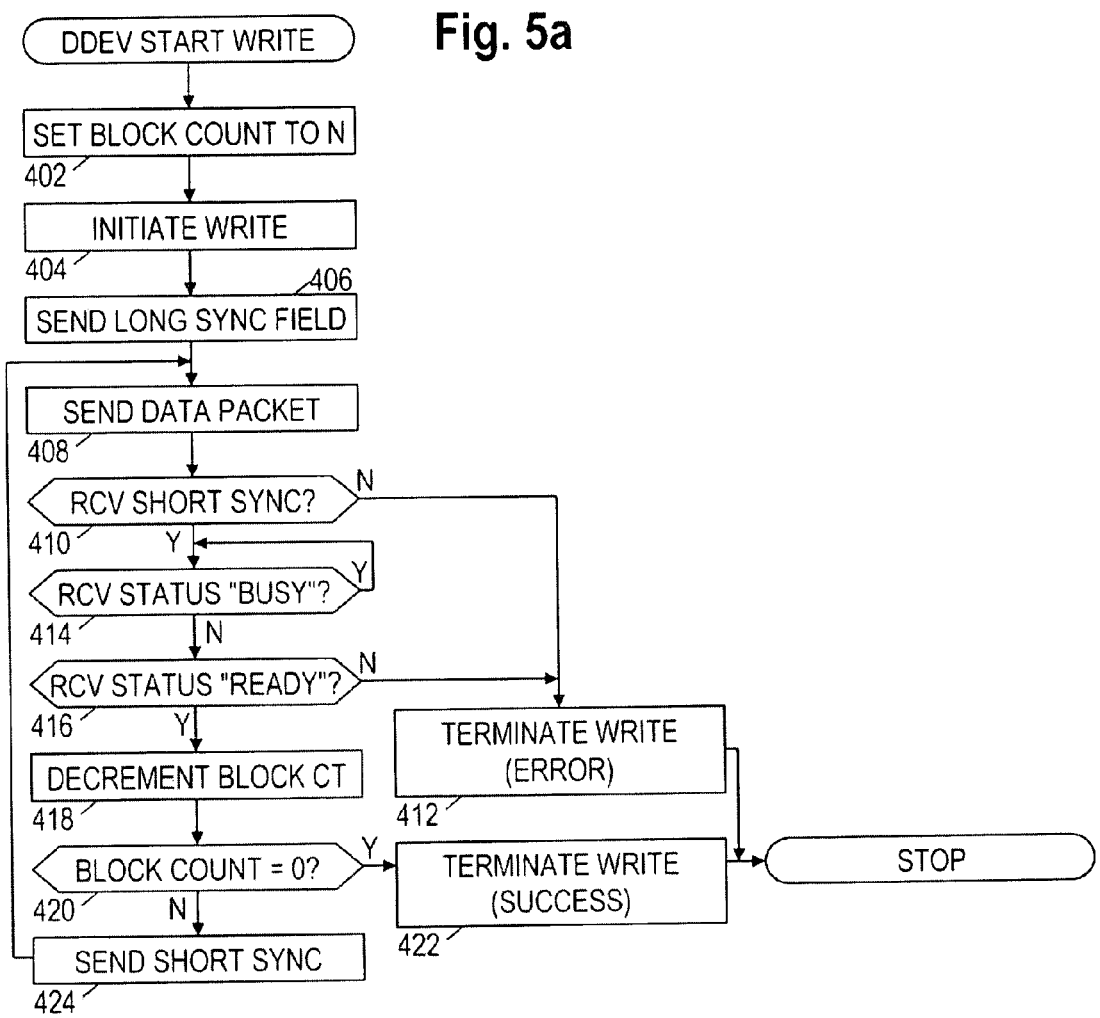
FIGS. 5a–5b show example flow diagrams that may be used to implement a write sequence in accordance with certain information transfer protocol embodiments.
Figure 5B:
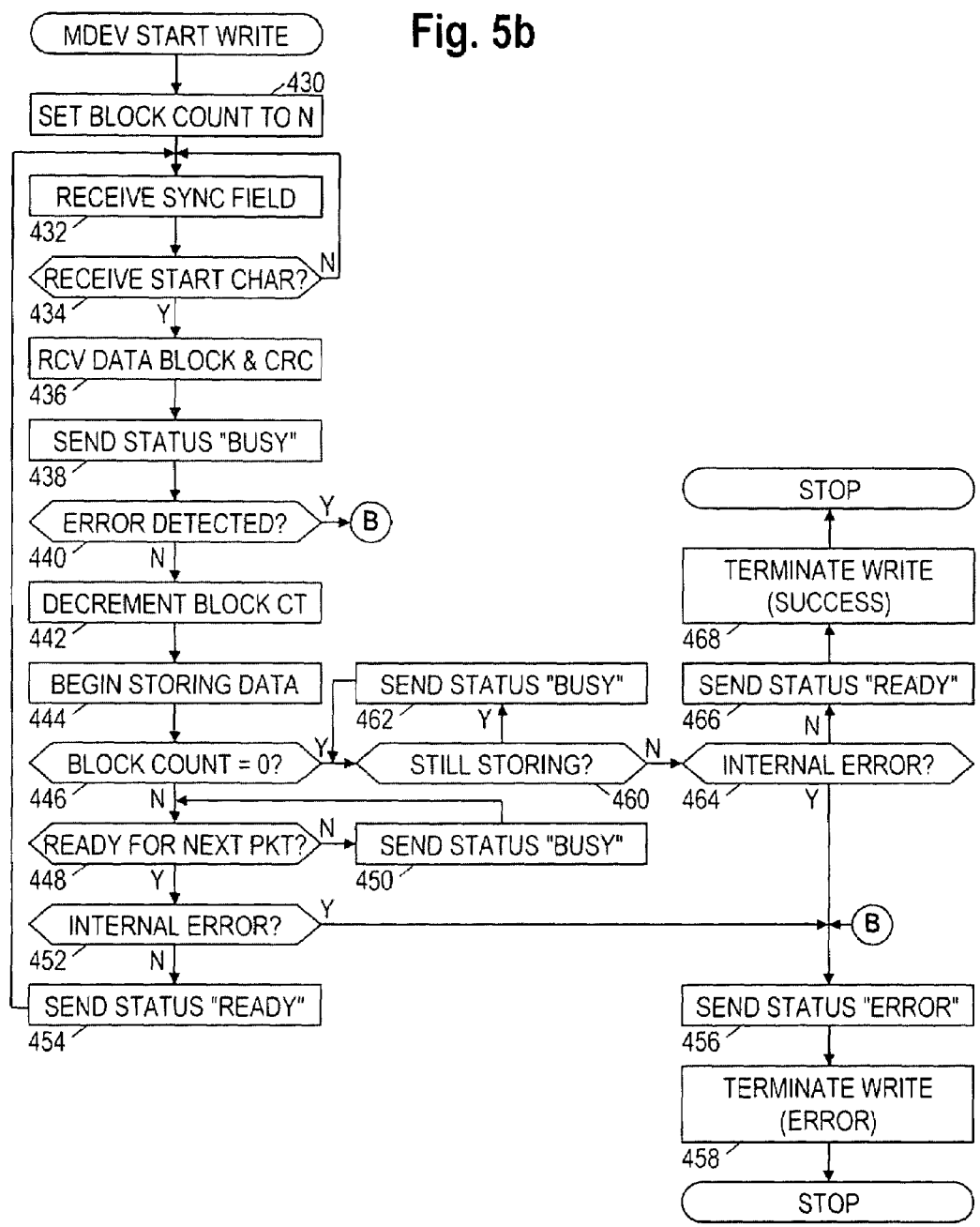

FIGS. 4a and 4b show read process embodiments. FIGS. 5a and 5b show write process embodiments. More generally, FIG. 5a shows an example of a flow diagram that a digital device may use to implement embodiments of the disclosed information transfer protocol.

Figures 9A, 9B, 9C:
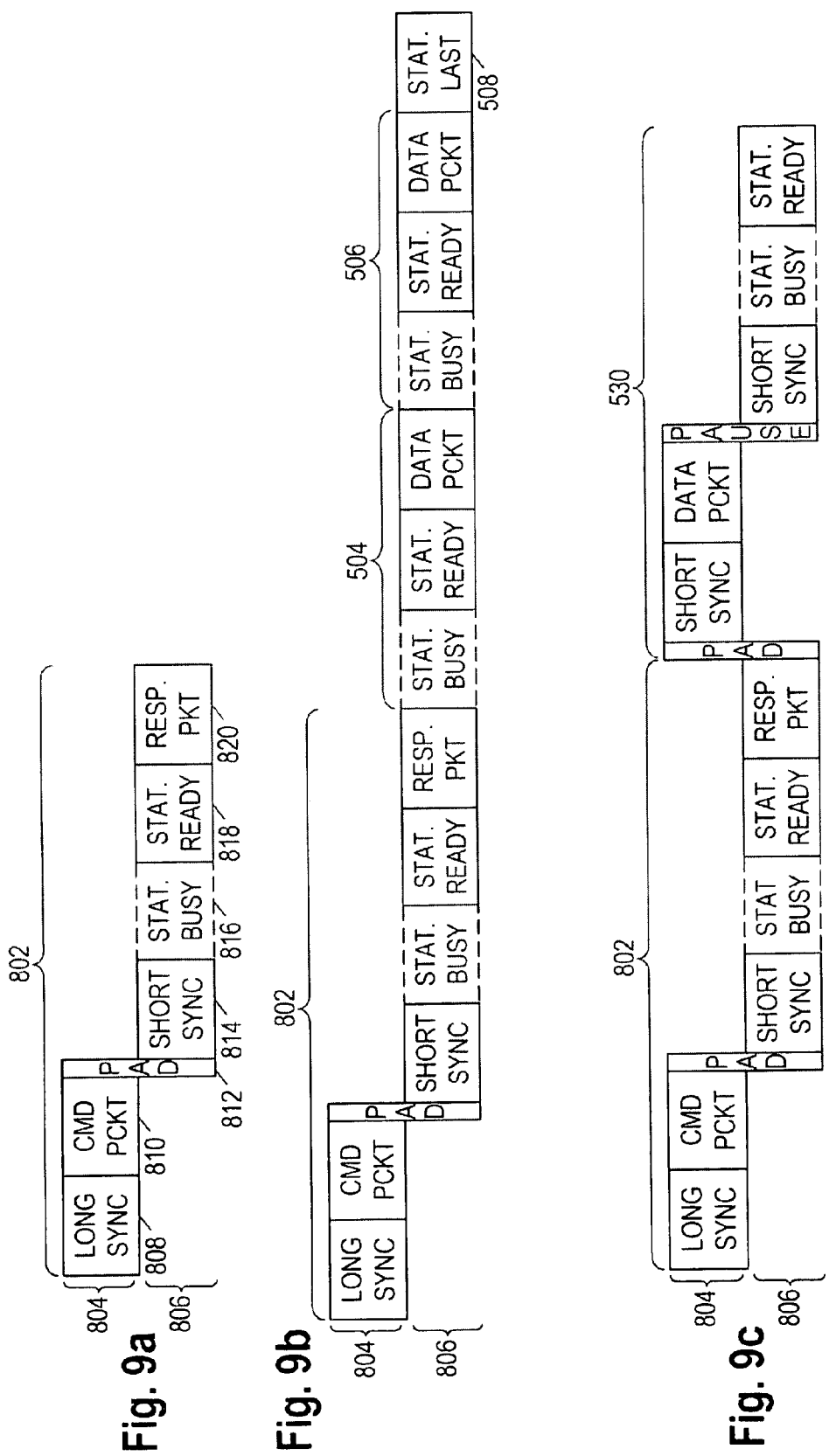
FIGS. 9a–9c show examples of communication sequences in accordance with still yet another information transfer protocol embodiment.

Beginning with block 402, digital device 102 sets a block counter to track the number of data packets to be sent. In block 404, digital device 102 initiates a data storage process to memory device 104. This initiating may be done by sending a command packet to memory device 104 via bus 106 (e.g., as shown in FIG. 9a). Alternatively, a write instruction may be communication to memory device 104 via some other mechanism such as a second bus 120. This initiating places the memory device in a condition to accept write data via bus 106.

In block 406, digital device 102 sends a long sync field via bus 106. In block 408, digital device 102 sends a data packet (including a data block and corresponding checksum) to memory device 104. In block 410, digital device 102 switches to receive mode and listens for a short sync field. If one is not received, then in block 412 the digital device terminates the write process due to an error. Otherwise, digital device 102 waits in block 414 until something other than a status "busy" field is received. In block 416, digital device 102 determines whether a status "ready" field has been received. If not, then control passes to block 412. Otherwise, in block 418 the digital device decrements the block count.

In block 420, digital device 102 determines whether the block counter is zero. If so, digital device 102 terminates the write process successfully in block 422. Otherwise, in block 424, digital device 102 switches to transmit mode and sends a short sync field. Control then passes back to block 408.

FIG. 5b shows an example of a flow diagram that may be used by memory device 104 to implement embodiments of the disclosed information transfer protocol. When the memory device receives a write instruction, either as a command packet via bus 106 or via some other mechanism, it sets a counter in block 430 to track the number of packets to be received. In block 432, memory device 104 receives a sync field. In block 434, memory device 104 determines whether the sync field is followed by a start character. If not, control returns to block 432. Otherwise, memory device 104 receives a data block and corresponding checksum in block 436 into a buffer.

In block 438, memory device 104 switches to transmit mode and sends a status "busy" field. In block 440, memory device 104 determines whether a receive error occurred, and if so, control passes to block 456. Otherwise, in block 442 memory device decrements the block count. In block 444, memory device 104 initiates a storage process, transferring data from the buffer to a storage medium. In block 446, memory device 104 determines whether the block count is zero. If not, then in block 448 memory device 104 determines whether there is enough room in the buffer for another data packet. If not, then in block 450, memory device sends another status "busy" field, and returns to block 448.

Otherwise, in block 452, memory device 104 determines whether an internal error has occurred with the transfer of data to the storage medium. If not, then in block 454, memory device 104 sends a status "ready" field and control returns to block 432. Otherwise, memory device 104 sends a status "error" field in block 456, and terminates the write process due to an error in block 458.

Returning to block 446, if the block count has reached zero, then in block 460 the memory device determines whether the transfer to storage media is still ongoing. If so, then memory device 104 sends a status "busy" field in block 462 and returns to block 460. Otherwise, memory device 104 determines in block 464 whether an error has occurred during the transfer to storage. If so, then control passes to block 456. If not, the memory device 104 sends a status "ready" message in block 466 and terminates the write process successfully in block 468.

FIGS. 4a, 4b, 5a and 5b described at various point the use of status "busy" and status "ready" fields. It is noted that various alternative embodiments are contemplated (as described further below) that omit the use of such fields in favor of a control line which may be asserted to indicate a "busy" status and de-asserted to indicate a "ready" status. One of ordinary skill in the art will readily recognize that with minor alterations, the flow diagrams described above may also be used to implement these alternate embodiments.

Figure 6A:
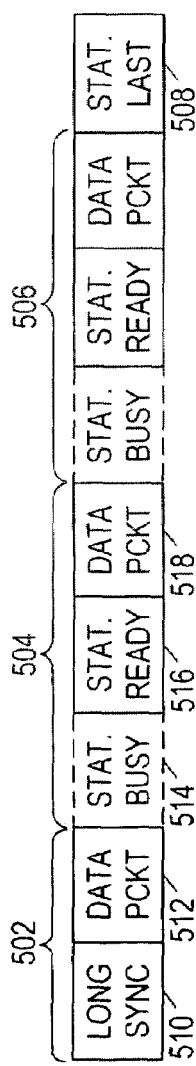
FIGS. 6a–6d show examples of communication sequences in accordance with one information transfer protocol embodiment.

FIGS. 6a–6d show examples of communication sequences that may be produced by one embodiment of the disclosed information transfer protocol. FIG. 6a shows an example of an error-free read sequence that includes a start segment 502, multiple subsequent segments 504, 506, and an end segment 508, each sent by memory device 104 to digital device 102. (Note that segments 504 and 506 would be omitted if only one data block were to be sent.) The start segment 502 includes a long sync field 510 and a first data packet 512. The subsequent segments 506, 506 each include zero or more status "busy" fields 514, followed by a status "ready" field 516, followed by a data packet 518. The end segment may be just a status "last" field to indicate that the last data packet has been sent.

Figure 6B:
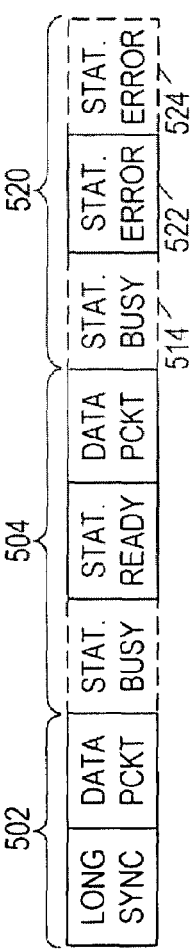

FIG. 6b shows an example of read sequence involving an error. Memory device 104 transmits start segment 502, subsequent segment 504, and error segment 520. Memory device 104 may begin transmitting the error segment 520 in response to detecting an internal error or in response to receiving a terminate command from digital device 102 via a second bus 120. Error segment 520 may include zero or more status "busy" fields 514 and one or more status "error" fields 522 indicating an error status. The status "error" fields may continue to repeat until digital device 102 takes action to terminate the read process, e.g., by sending a status request via second bus 120.

Figure 6C:
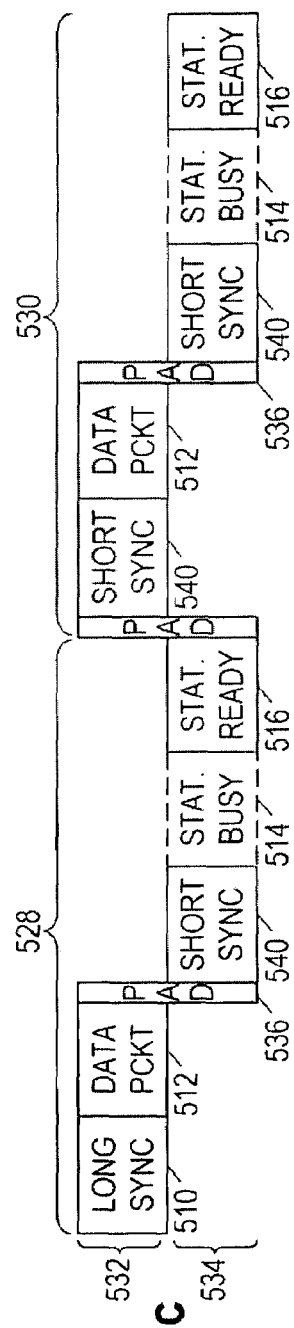

FIG. 6c shows an example of an error-free write sequence. Digital device 102 sends the fields and packets shown on upper level 532 and memory device 104 sends the fields shown on lower level 534. The error-free write sequence includes a start segment 528 and may include zero or more subsequent segments 530. Start segment 528 includes a long sync field 510 and a first data packet 512 sent from digital device 102 via bus 106. Data packet 512 may be followed by a pad 536 to allow the electronics to transition from transmit to receive and vice versa. The pad time may be about two bit cell times, or between about 1–2 nanoseconds.

Memory device 104 responds with a short sync field 540, zero or more status busy fields 514, and a status ready field 516. Subsequent segment 530 has a similar structure, distinguished in that it begins with a short sync field 540 rather than a long sync field. It is expected that at least one status busy field may be sent for the last segment to allow data to be flushed from the receive buffer.

Figure 6D:
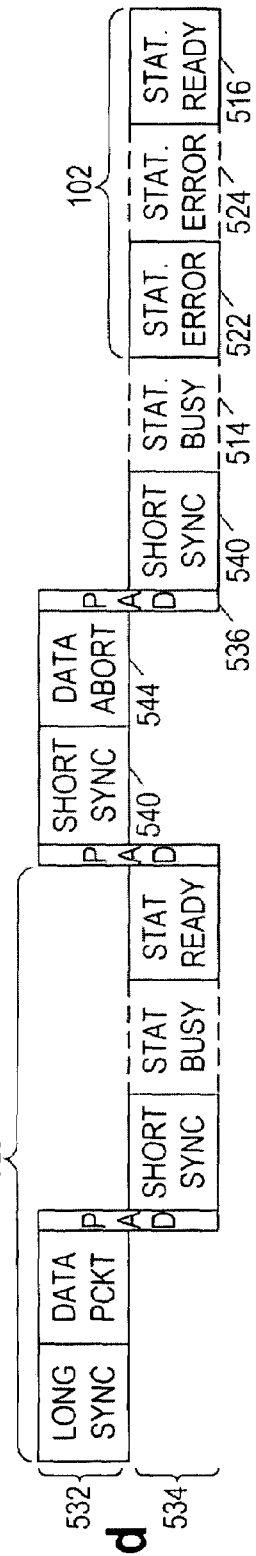

FIG. 6d shows an example of a write sequence which encounters an error or is aborted. After first segment 528, digital device 102 begins a subsequent segment with a short sync field 540 and a data packet 544. Data packet 544, if an aborted transfer, may include an invalid character or may be terminated early with an abort character. After a pause 536, memory device 104 may send a short sync field 540, zero or more status busy fields 514, one or more status error fields 522, and a status ready field 516. Memory device 104 may wait to transmit status ready field 516 until digital device 102 has sent a status request command via second bus 120.

Figure 7A:
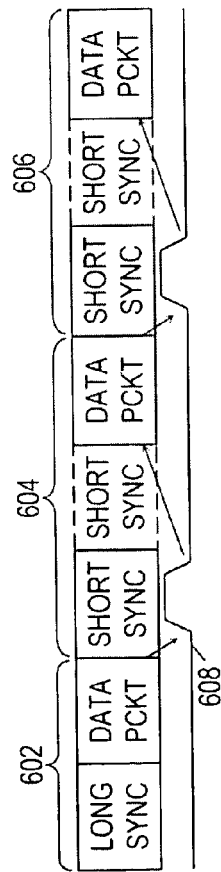
FIGS. 7a–7d show examples of communication sequences in accordance with another information transfer protocol embodiment.

FIGS. 7a–7d show example communication sequences that may be produced by another embodiment of the disclosed information transfer protocol. In this embodiment, bus 106 may include an error/hold signal line (alternatively termed a "control line") controlled by memory device 104. FIG. 7a shows an example of an error-free read sequence in which memory device 104 transmits a start segment 602 which may be followed by one or more subsequent segments 604, 606. Start segment 602 includes a long sync field and a data packet. Memory device 104 follows the start segment with a subsequent segment 604 having one or more short sync fields and a data packet. Memory device 104 asserts an error/hold signal 608 after each data packet and de-asserts the signal once the transmission of a subsequent data packet is ready to occur. The subsequent data packs is sent once a complete short sync has been sent following de-assertion of error/hold.

Figure 7B:
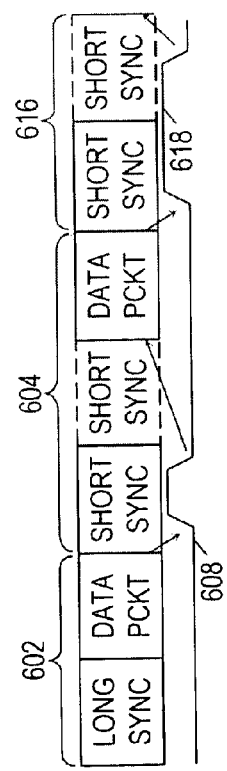

FIG. 7b shows an example of a read sequence in which an error is detected. An internal error may cause memory device 104 to provide a series of short sync fields 616 and an error/hold signal assertion 618, both of which may be maintained until digital device 102 sends a status inquiry via a second bus 120.

Figure 7C:
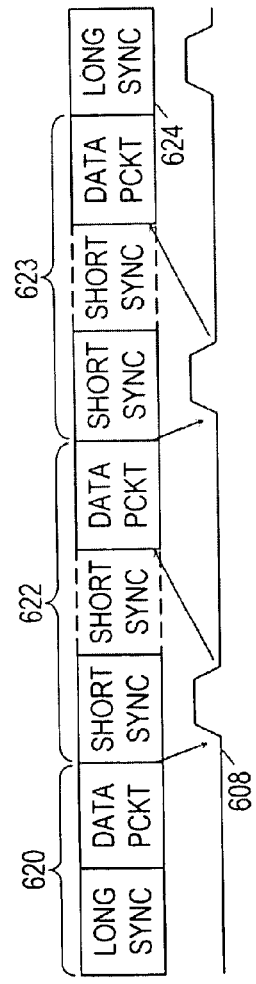

FIG. 7c shows an example of an error-free write sequence in which digital device 102 sends an initial segment 620, subsequent segments 622 and 623, and an end segment 624. The memory device 104 continues to have control over the error/hold signal 608. Initial segment 620 includes a long sync field followed by a data packet. Memory device 104 asserts error/hold signal 608 after each data packet is received, and de-asserts the signal to indicate when it is ready to receive another data packet. While error hold is asserted, the digital device sends complete short sync fields. The subsequent segments 622 include one or more short sync fields preceding a data packet. The end segment may include a long sync field.

Figure 7D:
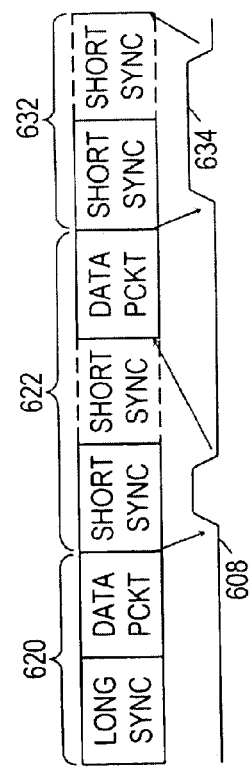

FIG. 7*d* shows an example of a write sequence in which an error is encountered during or shortly after subsequent segment 622 is sent. The memory device provides an error signal assertion 634 (on the error/hold line) which may continue until digital device 102 sends a status inquiry via a second bus 120. The continued assertion 634 may cause digital device 102 to continue sending a sequence 632 of short sync fields until it determines that a status inquiry is necessary.

FIGS. 8*a*–8*d* show example communication sequences that may be produced by yet another embodiment of the disclosed information transfer protocol. In this embodiment, digital device 102 and memory device 104 may have negotiated to determine a bus rate at which to operate. This bus rate may be different for read operations and write operations. The bus rate in each case may be a best estimate of the lesser of the rates supported by the digital device and the memory device.

Figure 8A:
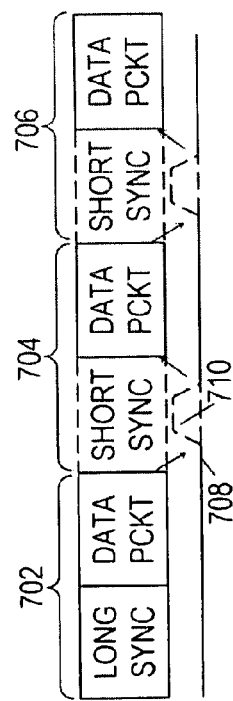
FIGS. 8a–8d show examples of communication sequences in accordance with yet another information transfer protocol embodiment.

FIG. 8*a* shows an example of an error-free read sequence in which memory device 104 sends a first segment 702 followed by subsequent segments 704, 706. The first segment may include a long sync field followed by a data packet. Subsequent segments may each include a data packet preceded by zero or more short sync fields. Memory device 104 may send short sync fields and provide an assertion 710 of an error/hold signal 708 when the memory device is not ready to send a subsequent data packet. Such may be the case if the negotiated rate turns out to be higher than what the memory device supports. Ideally, the short sync fields and assertions of the error/hold signal may be omitted if a proper rate has been chosen.

Figure 8B:
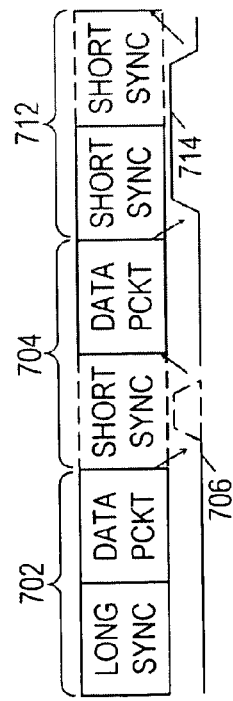

FIG. 8*b* shows an example of a read sequence that encounters an error. Upon detecting the error, memory device 104 provides a series 712 of one or more short sync fields and an assertion 714 of error/hold signal 706 [There appears to be two different 706 in the drawing, this reference in the drawing ought to be 708 for clarity]. The series and assertion may continue until digital device 102 sends a status inquiry via a second bus 120.

Figure 8C:
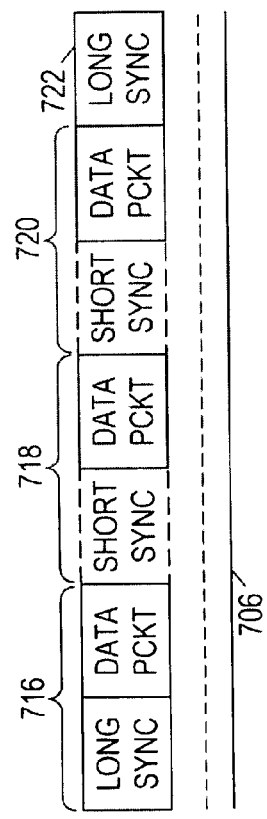

FIG. 8*c* shows an example of an error-free write sequence in which the digital device 102 sends an initial segment 716 followed by subsequent segments 718, 720, and an end segment 722. Control of the error/hold signal 708 is maintained by the memory device 104. Memory device 104 may assert signal 708 to indicate an error or an imminent overflow. Absent any errors and assuming a proper bus rate, signal 708 may remain de-asserted.

Initial segment 716 may include a long sync field followed by an initial data packet. Subsequent segments may each include a subsequent data packet preceded by zero or more short sync fields. End segment 722 may simply include a long sync field.

Figure 8D:
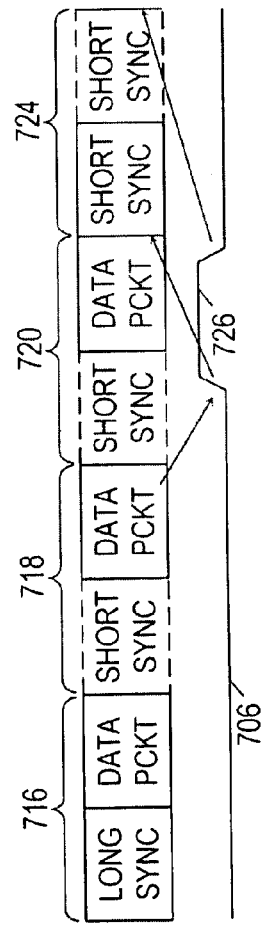

FIG. 8*d* shows an example of a write sequence in which memory device 104 provides an assertion 726 of signal 708 to indicate that it is not ready for a subsequent data packet. This assertion may be made prior to the end of the subsequent segment 720. Upon detecting assertion 726, digital device 102 halts data transmission and sends only a series 724 of one or more short sync fields until signal 708 is de-asserted. Memory device 104 may de-assert signal 708 upon receiving a status inquiry from digital device 102 via a second bus 120.

FIGS. 9*a*–9*c* show examples of communication sequences that may be produced by still yet another embodiment of the disclosed information transfer protocol. In this embodiment, digital device 102 and memory device 104 exchange command and response packets via bus 106. FIG. 9*a* shows an example of a command-response exchange 802 in which items on upper level 804 are sent by digital device 102 and items on lower level 806 are sent by memory device 104. Exchange 802 begins with digital device 102 sending a long sync 808 followed by a command packet 810. Command packet 810 may represent a read command, a write command, or a status request command. Other commands may also be represented. Following command packet 810 is a pause 812, after which memory device 104 sends one or more short sync fields 814, a status ready field 818, and a response packet 820. Response packet 820 may represent an acknowledgement of the command, and may status information and/or some indication of success or failure in parsing the command.

FIG. 9*b* shows an example of an error-free read sequence that comprises a command-response exchange 802 immediately followed by a series of one or more subsequent segments 504, 506 and an end segment 508. These segments may be as described previously with respect to FIG. 6*a*.

FIG. 9*c* shows an example of an error-free write sequence that includes a command-response exchange 802 followed by a subsequent data-ready exchange 530. The data-ready exchange 530 may be as described previously with respect to FIG. 6*c*.

Error handling may also be performed using the command-response exchange. For example, memory device 104 may indicate an error by sending a status "error" field. A pad period would follow, after which digital device 102 may initiate a command-response exchange as shown in FIG. 9*a* to determine the nature of the error and deal with it accordingly.

The above discussion is meant to be illustrative of various principles and embodiments. Numerous variations and modifications will become apparent to those skilled in the art once the above disclosure is fully appreciated. For example, the role of the digital device may be played by any host device or master device, including a computer system, a digital camera, a digital music player, etc. The memory device is but one example of a slave devices that would benefit from use of disclosed information transfer protocol embodiments, and other peripheral devices such as network interfaces, data acquisition cards, scanners, etc., may similarly benefit. It is intended that the following claims be interpreted to embrace all such variations and modifications.

What is claimed is:

1. A system that comprises:
   a master device; and
   a slave device coupled to the master device by at least one bus,
   wherein the master device transfers information to the slave device using a sync field of a first type followed by a first data packet, and wherein the slave device responds to each data packet with a sync field of a second, different type, followed by a status ready field if no additional time is needed before receiving another data packet,
   wherein the sync field of the second type is shorter than the sync field of the first type.

2. The system of claim 1, wherein the bus is a differential serial data bus configured to carry a data stream with embedded clock information.

3. The system of claim 2, wherein the slave device is further coupled to the master device by a second bus configured to transport data in a parallel format.

4. The system of claim 3, wherein the differential serial data bus and the second bus share common physical conductors.

5. The system of claim 3, wherein the master device communicates with the slave device via the second bus to initiate information transfers on the differential serial data bus.

6. The system of claim 1, wherein the slave device transfers information to the master device using a sync field of the first type before a first data packet.

7. The system of claim 6, wherein the slave device sends at feast one status field after sending each data packet.

8. A method of transferring information from a master device to a slave device, the method comprising:
- the master device sending a sync field of a first type;
- the master device sending a data packet;
- the slave device responding with a sync field of a second, different type; wherein the sync field of the second type is shorter than the sync field of the first type; and
- the slave device sending a status ready field if no additional time is needed before receiving another data packet.

9. The method of claim 8, further comprising:
- the master device sending a sync field of the second type after receiving the status ready field; and
- the master device sending a subsequent data packet.

10. A system that comprises:
- a master device; and
- a slave device coupled to the master device by a differential serial bus,
- wherein the slave device transfers information to the master device using a sync field followed by one or more data fields and a status field indicating that a last data packet has been sent,
- wherein the slave device uses a status "ready" field sent before each data packet except a first data packet to indicate that a subsequent data packet follows, and
- wherein the slave device further uses status "busy" fields as needed to indicate that additional time is needed before the slave device sends another data packet.

11. A method of transferring information between a digital device and a memory device, the method comprising:
- receiving a sync field of a first type;
- receiving a data packet;
- responding with a sync field of a second, different type, wherein the sync field of the second type is shorter than the sync field of the first type; and
- sending a status ready field if no additional time is needed before receiving another data packet.

12. The method of claim 11, further comprising:
- before sending each status ready field, determining whether additional time is needed before receiving another data packet, and if so, sending a series of one or more status busy fields.

13. A method of transferring information between a digital device and a memory device, the method comprising:
- sending a sync field of a first type from the memory device;
- sending a first data packet from the memory device; and
- for each subsequent data packet from the memory device:
  - sending a series of one or more sync fields of a second type from the memory device, wherein the sync fields of the second type are shorter than the sync field of the first type;
  - asserting a hold signal by the memory device;
  - de-asserting the hold signal by the memory device before sending the subsequent data packet; and
  - sending the subsequent data packet from the memory device.

14. The method of claim 13, further comprising:
- maintaining the hold signal in an asserted state to abort an information transfer sequence.

15. The method of claim 13, further comprising:
- receiving a sync field of the first type;
- receiving a first data packet;
- receiving zero or more subsequent data packets, each subsequent data packet being preceded by one or more sync fields of a second type;
- receiving a sync field after a last data packet; and
- asserting the hold signal to acknowledge receipt of each data packet; and
- de-asserting the hold signal to indicate readiness to receive each subsequent data packet.

16. The method of claim 13, wherein control of the hold signal is maintained by the memory device, irrespective of whether the memory device is sending or receiving.

17. A system that comprises:
- a master device; and
- a slave device coupled to the master device by a differential serial bus, wherein the slave device transfers information to the master device by:
  - sending a sync field of a first type;
  - sending a first data packet; and
  - determining whether additional time is necessary for sending each subsequent data packet, and if so:
    - sending a series of one or more sync fields of a second type,
      - wherein the sync fields of the second type are shorter than the sync field of the first type;
    - asserting a hold signal;
    - de-asserting the hold signal before sending the subsequent data packet; and
    - sending the subsequent data packet.

18. The system of claim 17, wherein the slave device accepts information transfers from the master device by:
- receiving a sync field of the first type;
- receiving a first data packet; and
- receiving zero or more subsequent data packets, each subsequent data packet being preceded by one or more sync fields of a second type.

19. A method of transferring information between a digital device and a memory device, the method comprising:
- sending a sync field of a first type;
- sending a first data packet; and
- determining whether additional time is necessary for sending each subsequent data packet, and if so:
  - sending a series of one or more sync fields of a second type, wherein the sync field of the second type is shorter than the sync field of the first type;
  - asserting a hold signal;
  - de-asserting the hold signal before sending the subsequent data packet; and
  - sending the subsequent data packet.

20. The method of claim 19, further comprising:
- receiving a sync field of the first type;
- receiving a first data packet; and receiving zero or more subsequent data packets, each subsequent data packet being preceded by one or more sync fields of a second type.

21. The method of claim 20, further comprising:
aborting an information transfer sequence by asserting the hold signal.

22. A system that comprises:
a master device; and
a slave device coupled to the master device by a differential serial bus,
wherein the master device and slave device cooperate in a command-response exchange including:
the master device sending a sync field of a first type, followed by a command packet; and
the slave device sending a sync field of a second type, followed by one or more status "busy" fields if additional time is needed to send a response, followed by a status "ready" field and a response packet, wherein the sync field of the second type is shorter than the sync field of the first type.

23. The system of claim 22, wherein if the command packet represents a read command, the slave device is further configured to send a sequence of one or more data segments after the response packet, each data segment including a status "ready" field followed by a data packet.

24. A method of transferring information between a digital device and a memory device, the method comprising:
cooperating in a command-response exchange, said cooperating including:
receiving a sync field of a first type;
receiving a command packet;
sending a sync field of a second type, wherein the sync field of the second type is shorter than the sync field of the first type;
sending a series of one or more status busy fields if additional time is needed to prepare a response;
sending a status ready field; and
sending a response packet.

25. The method of claim 24, further comprising:
sending a read sequence if the command packet includes a read command, said sending including:
sending a sync field;
sending a data packet; and
sending a status last field indicating that a last data packet has been sent.

26. The method of claim 25, further comprising:
cooperating in a write sequence if the command packet includes a write command, said cooperating including:
receiving a sync field of a first type;
receiving a data packet;
responding with a sync field of a second, different type; and
sending a status ready field if no additional time is needed before receiving another data packet.

* * * * *